United States Patent Office 3,729,410
Patented Apr. 24, 1973

---

3,729,410
DE-OILING OF POLLUTED WATERS
Albert Abadie, Argeles Gazost, and Henri Roques, Portet-sur-Garonne, France, assignors to Anvar (Agence Nationale de Valorisation de la Recherche), Courvevoie, France
No Drawing. Filed Mar. 3, 1971, Ser. No. 120,695
Claims priority, application France, Mar. 3, 1970,
7007641
Int. Cl. E02b 15/04
U.S. Cl. 210—32
23 Claims

ABSTRACT OF THE DISCLOSURE

A process for de-oiling polluted waters which comprises contacting the oil-containing water with an oleophilic resin having a high surface area, for example, in the form of a powder or small spherules or granules, and removing the treated water from the resin, after several stages as necessary if a particular degree of de-oiling is desired. The oleophilic resin can be an ion exchange resin; the oleophilic properties are imparted thereto by organic ions fixed thereon. Accordingly, an ion exchange operation can be conducted concurrently with the de-oiling process, if desired.

---

This invention relates to the de-oiling of polluted waters. More particularly, it relates to a process for freeing oil-containing waste and industrial waters from the oils which they contain by the use of oleophilic resins.

The problem concerning the purification of recycle or effluent waters is the order of the day. In certain cases, it is necessary to free the same from the oils which they contain. Several processes have been advanced in the art for the purpose of accomplishing this objective, however, the majority of these are solely directed to or concerned with emulsions which are produced either with or without emulsifiers. Some of these emulsions formed by means of emulsifiers are sometimes considered as being genuine solutions, for example, so-called "soluble" cutting oils.

The general technique of these different processes consists in breaking up the emulsion by (a) decanting by putting the solution at rest, or circulating the solution in a laminar system by circulation between either plane or undulated plates;

(b) adding a mineral salt in a small amount, for example, NaCl, $(SO_4)_3Al_2$, etc., this process having the advantage of being less burdensome, but being long and involving the risk of bringing about a significant salinification of the treated water;

(c) adding acid and heating, a method which has the drawbacks of a relatively long duration and the need for a subsequent neutralization, as well as for the use of a material which is resistant to acids; and (d) flocculation; the floc obtained is a flocculent precipitate of hydroxides which carries along the microparticles of oil. This is a rather delicate process to carry out and is not feasible with slimes charged with oil.

Once the emulsions are broken up, it is advisable to recover the hydrocarbons which have been freed, which may be accomplished by (a) mechanical processes which skim off the floating oily layer and (b) adsorption (usually with pulverulent silica).

From among the other de-oiling processes known in the art, the following may also be mentioned: biological degradations (slow process), combustion (burdensome process) and adsorption with active carbon. All of these procedures involve various disadvantages and drawbacks.

Accordingly, one of the objects of the present invention is to provide a procedure for the de-oiling of polluted waters which overcomes the deficiencies and disadvantages of the prior art procedures.

Another object of the present invention is to provide a process for cleaning up oil-containing waters which may be carried out in an effective and advantageous manner.

A further object of the invention is to provide an anti-pollution method which can be used to clean up polluted waters and, thus, to help restore the environment by, in particular, providing a means for de-oiling polluted waste and industrial effluent waters.

These and other objects and advantages of the present invention will become apparent to those skilled in the art from a consideration of the following specification and claims.

The process of the present invention involves the use of ion exchange (anionic or cationic) resins upon which there are fixed organic ions (anions or cations). As a result, materials are obtained which are endowed with remarkable oleophile properties.

These oleophilic resins are employed either singly or in combination with non-oleophilic resins, and they constitute a choice material for eliminating either soluble or emulsified hydrocarbons which pollute certain residual water. The operation is carried out by simple contact.

The oleophile resins to be employed in accordance with this invention are conventional ion exchange resins upon which organic ions are ionically fixed. As such resins, use is made, for example, of two commercial products which can be obtained either in the form of a powder or spherules having a diameter of approximately ten millimeters. These are (a) a cationic resin of a strong type (a copolymer of sulfonated styrene divinylbenzene) and (b) an anionic resin of a strong type (a copolymer of styrene divinylbenzene) upon which there are fixed or attached ionic functions such as, for example, $$-N^+(CH_3)_3Cl^-.$$

As organic ions, the following may be utilized:

(a) various alkyl pyridinium cations such as lauryl pyridinium chloride

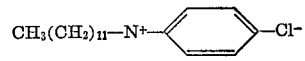

and cetyl pyridinium chloride

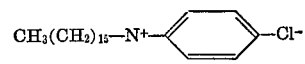

(b) anionic sulfates of fatty alcohols such as $$CH_3(CH_2)_{11}OSO_3^-Na^+$$

The content of organic ion fixed on the resin may range from several percent to the entirety of the limit exchange capacity for the particular organic ion utilized.

The oleophilic properties with respect to the aqueous hydrocarbon solutions or the emulsions thereof in water encompass all of the combinations between (1) the different existing ion exchange resins and (2) all of the organic ions which are susceptible to being fixed thereon. Correspondingly, the process of this invention is applicable to (a) emulsified hydrocarbons (with or without emulsifiers) as well as (b) dissolved hydrocarbons.

The following specific embodiments are exemplary of the present invention and are not to be considered as limiting.

(1) Hydrocarbons dissolved naturally without an emulsifier, for example, benzene Approximately 55% of the initial content of benzene (1.6 g./l.) was eliminated on the first theoretical plateau when treated on a column of oleophilic resin. With a sufficient number of plateaus, it is possible to continue the elimination or exhaustion of the benzene as far as may be desired.

(2) Emulsified hydrocarbons (without an emulsifier), for example, n-decane

On the first theoretical plateau, about 90% of the initial quantity (0.5 g./l.) can be eliminated with an oleophilic resin contained on a column. It is not necessary, in this case, to treat the emulsion any further than in case (1).

(3) Oils "solubilized" by means of an ionic emulsifying agent

The preliminary operation consists in eliminating the surface-active material by adsorption on a standard resin. The hydrocarbons are then freed from the solution by using an oleophilic resin in a mixed bed.

The advantages of the process of the present invention are as follows:

(1) The integral regeneration of the oleophile properties is rendered easy either by means of a humid hot air current or an organic solvent, such as acetone, methanol, etc.

(2) The oleophilic resins may be employed, without danger to their specific properties, with rather concentrated saline solutions (for example, 2 g./l. of sodium chloride) the maximum acceptable salinity conditions being determined in each case. For example, a strong cationic resin of the type $RSO_3^-$ having 50% in the form of $Na^+$ and 50% in the form of $CH_3(CH_2)_{15}N^+$ cannot be used in solutions wherein the concentration of NaCl is greater than 5.5 g./l.

(3) The non-organic ions of the resin will remain exchangeable, with the result that an ion exchange operation can be accomplished at the same time that the de-oiling operation is carried out. The regeneration of the mineral portion of the resin, without affecting the oleophilic properties of the resin, can be carried out easily under the condition that the permissible limit concentration of the regenerating agent is known.

In summary, the present invention relates toward aiding in the environmental problems present today, particularly with regard to cleaning up oil-containing waste or industrial waters. The processes known heretofore, mainly concerned with oils which have been emulsified either with or without a surface active agent, have many disadvantages. The present invention is significantly effective and advantageous with such waters, as well as with waters containing naturally soluble hydrocarbons. In any event, the present invention can be used in each of these cases with a higher yield of removed oil than can be obtained with the prior art processes. The waters to be treated in accordance with this invention are placed in the presence of oleophilic resins having the form of a powder or spherules with a small diameter or are passed through a column containing the oleophilic resin. The oleophilic resins employed may be prepared from ion exchange resins such as they exist in commerce; the oleophilic properties are imparted thereto by organic ions which are fixed or attached to the resins. Either anionic or cationic resins may be used. Various combinations between ion exchange resins and organic resins containing ions with oleophilic properties can be employed. Using these resins, the process is applicable, as noted above, to emulsified hydrocarbons, with or without an emulsifier, as well as to waters containing dissolved hydrocarbons.

The invention being thus described, it will be obvious that the same may be varied in many ways. Such variations are not to be regarded as a departure from the spirit and scope of the invention, and all such modifications as would be obvious to one skilled in the art are intended to be included herein.

We claim:

1. A process for de-oiling oil-containing water which comprises contacting the oil-containing water with an ion exchange resin having a high surface area and oleophilic properties imparted thereto by organic ions fixed thereon, and removing the treated water from said resin.

2. The process of claim 1, wherein the oleophilic resin has the form of a powder.

3. The process of claim 1, wherein the oleophilic resin has the form of small spherules.

4. The process of claim 1, wherein the ion exchange resin is a cationic resin comprising a copolymer of sulfonated styrene divinylbenzene.

5. The process of claim 1, wherein the ion exchange resin is an anionic resin comprising a copolymer of styrene divinylbenzene having $-N^+(CH_3)_3Cl^-$ groups attached thereto.

6. The process of claim 1, wherein the organic ions are selected from the group consisting of cetyl pyridinium chloride, lauryl pyridinium chloride and sodium lauryl sulfate ions.

7. The process of claim 1, wherein the water to be treated comprises water containing emulsified hydrocarbons with or without an emulsifier, water containing dissolved hydrocarbons or a mixture thereof.

8. The process of claim 1, wherein the oil is an aromatic hydrocarbon.

9. The process of claim 1 wherein the oil is an aliphatic hydrocarbon.

10. The process of claim 1, wherein the oil is a petroleum fraction or a petroleum crude.

11. The process of claim 1, wherein the resin further includes non-organic ions and an ion exchange operation by means of the non-organic ions takes place concurrently with the de-oiling process.

12. The process of claim 1, wherein the water to be treated comprises water containing oil solubilized by an ionic emulsifying agent wherein said agent is first eliminated by adsorption on a standard resin.

13. The process of claim 1, wherein the oleophilic properties of said resin are regenerated after removing the treated water.

14. The process of claim 13, wherein said regeneration is effected by means of a humid hot air current or an organic solvent.

15. The process according to claim 14, wherein the organic solvent is acetone or methanol.

16. A process for de-oiling oil-containing water which comprises passing the oil-containing water through a column containing an ion exchange resin having a high surface area and oleophilic properties imparted thereto by organic ions fixed thereto, and removing the treated water from said resin.

17. The process of claim 16, wherein the resin has the form of a powder or small spherules.

18. The process of claim 16, wherein the ion exchange resin is a cationic resin.

19. The process of claim 16, wherein the ion exchange resin is an anionic resin.

20. The process of claim 16, wherein the resin further includes non-organic ions and an ion exchange operation by means of the non-organic ions takes place concurrently with the de-oiling process.

21. The process according to claim 16, wherein the oleophilic properties of said resin are regenerated after removing the treated water.

22. The process of claim 21, wherein said regeneration is effected by means of a humid hot air current or an organic solvent.

23. The process of claim 22, wherein the organic solvent is acetone or methanol.

References Cited

UNITED STATES PATENTS

| | | | |
|---|---|---|---|
| 3,487,928 | 1/1970 | Canevari | 210—40 |
| 3,215,623 | 11/1965 | Hix | 210—32 X |
| 3,464,920 | 9/1969 | Pirson et al. | 210—40 X |
| 2,974,178 | 3/1961 | Hwa et al. | 210—32 X |

FOREIGN PATENTS 573,408    11/1945    Great Britain    210—DIG 21

SAMIH N. ZAHARNA, Primary Examiner

U.S. Cl. X.R.

210—40, DIG. 21